（12）United States Patent
Floco

(10) Patent No.: US 10,441,071 B2
(45) Date of Patent: Oct. 15, 2019

(54) TRAVEL TRAY AND CONTAINER SYSTEM

(71) Applicant: Pierpoint, Inc., San Diego, CA (US)

(72) Inventor: Ried Floco, San Diego, CA (US)

(73) Assignee: PIERPOINT, INC., Escondido, CA (US)

( * ) Notice: Subject to any disclaimer, the term of this patent is extended or adjusted under 35 U.S.C. 154(b) by 0 days.

(21) Appl. No.: 15/847,815

(22) Filed: Dec. 19, 2017

(65) Prior Publication Data

US 2019/0183240 A1   Jun. 20, 2019

(51) Int. Cl.
*A47B 13/16* (2006.01)
*A45C 11/20* (2006.01)
*B60N 3/10* (2006.01)
*B60N 3/00* (2006.01)
*A47B 13/10* (2006.01)

(52) U.S. Cl.
CPC .............. *A47B 13/16* (2013.01); *A47B 13/10* (2013.01); *B60N 3/002* (2013.01); *B60N 3/105* (2013.01)

(58) Field of Classification Search
CPC ................................. A45C 11/20; A47B 13/16
See application file for complete search history.

(56) References Cited

U.S. PATENT DOCUMENTS

| 1,544,972 | A | 7/1925 | Gebelein |
|---|---|---|---|
| D87,682 | S | 8/1932 | Pouter |
| 1,872,491 | A | 8/1932 | Noetzel |
| 2,063,289 | A | 12/1936 | Alusas |
| D105,687 | S | 8/1937 | Bode |
| 2,107,023 | A | 2/1938 | Bertsch |
| 2,584,557 | A | 2/1952 | Cuthbertson |
| 2,640,595 | A | 6/1953 | Byford |
| 2,799,147 | A | 7/1957 | Crawford |
| 3,079,037 | A | 2/1963 | Schechter |
| 3,250,422 | A | 5/1966 | Parish |
| 3,257,024 | A | 6/1966 | Semanchik |
| 3,401,858 | A | 9/1968 | White et al. |
| 3,491,893 | A | 1/1970 | Morris |

(Continued)

FOREIGN PATENT DOCUMENTS

| JP | 2010202262 A | * | 9/2010 | ............. B65D 25/20 |
|---|---|---|---|---|
| JP | 2010202262 A | * | 9/2010 | |

OTHER PUBLICATIONS

Uxcell Vehicle Car Tray—Amazon.com listing accessed May 8, 2017.

(Continued)

*Primary Examiner* — Nathan J Newhouse
*Assistant Examiner* — Lester L Vanterpool
(74) *Attorney, Agent, or Firm* — Eleanor Musick; Musick Davison LLP

(57) ABSTRACT

A travel tray and container system includes a base having a cylinder for receiving a beverage container and a tray having a tray shape extending in a horizontal plane to bisect the cylinder to define an upper cylinder and a lower cylinder eccentrically disposed within the horizontal plane. The lower cylinder is dimensioned to closely fit within a cupholder. The tray has a vertical wall extending around its perimeter, where the upper cylinder and the vertical wall define a tray retention volume having an eccentric cut-out region corresponding to the cylinder. A removable insert has a shape that fits within the tray retention volume, the insert having upper edges configured for attachment of a container-sealing lid.

22 Claims, 6 Drawing Sheets

(56) References Cited

U.S. PATENT DOCUMENTS

| | | | |
|---|---|---|---|
| 3,526,335 A | 9/1970 | Swett et al. | |
| 3,642,239 A | 2/1972 | Zeiler | |
| 3,800,939 A | 4/1974 | Cornelius | |
| 3,808,084 A | 4/1974 | Doty | |
| 3,877,603 A | 4/1975 | Holz | |
| 3,949,876 A | 4/1976 | Bridges et al. | |
| 4,040,549 A | 8/1977 | Sadler | |
| 4,071,163 A | 1/1978 | Martin | |
| 4,202,465 A * | 5/1980 | McLaren | B65D 5/48022 220/23.83 |
| 4,208,006 A | 6/1980 | Bixler et al. | |
| 4,221,320 A * | 9/1980 | Faller | B65D 5/38 229/122.34 |
| 4,279,354 A * | 7/1981 | Conti | A47G 19/02 206/501 |
| 4,286,713 A * | 9/1981 | Marchais | B65D 21/0217 206/508 |
| 4,334,623 A | 6/1982 | Geary | |
| D270,324 S | 8/1983 | French | |
| 4,516,685 A | 5/1985 | French | |
| 4,524,701 A | 6/1985 | Chappell | |
| D291,957 S | 9/1987 | Stevens | |
| D298,296 S | 11/1988 | Washburn et al. | |
| 4,798,413 A | 1/1989 | Capelli | |
| 4,966,297 A * | 10/1990 | Doty | A47G 19/06 206/564 |
| 4,969,618 A | 11/1990 | Thompson | |
| D322,197 S | 12/1991 | Sherlin | |
| 5,114,108 A | 5/1992 | Olschansky | |
| D326,588 S | 6/1992 | Meisel | |
| 5,118,063 A | 6/1992 | Young | |
| 5,135,195 A | 8/1992 | Dane | |
| 5,171,077 A | 12/1992 | Jondahl et al. | |
| D342,421 S | 12/1993 | DuBow | |
| 5,330,145 A | 7/1994 | Evans et al. | |
| 5,335,787 A * | 8/1994 | Finchum | B65D 1/36 206/518 |
| D353,289 S | 12/1994 | Ayotte et al. | |
| 5,419,451 A * | 5/1995 | Bitel, Jr. | B65D 1/36 206/508 |
| 5,421,459 A | 6/1995 | Mazzotti | |
| D359,885 S | 7/1995 | Yanuzzi | |
| 5,598,944 A | 2/1997 | Aragona | |
| 5,601,268 A | 2/1997 | Dunchock | |
| D378,334 S | 3/1997 | Legere | |
| 5,651,523 A * | 7/1997 | Bridges | B60N 3/103 206/549 |
| D382,727 S | 8/1997 | Kresge et al. | |
| 5,702,041 A | 12/1997 | Sun et al. | |
| 5,711,595 A | 1/1998 | Gerbe | |
| 5,713,628 A | 2/1998 | Lucatuorto | |
| 5,769,264 A | 6/1998 | Lipkowitz | |
| 5,772,050 A | 6/1998 | Shih | |
| D398,480 S | 9/1998 | Chica | |
| D404,218 S | 1/1999 | Sussman | |
| 5,865,124 A | 2/1999 | Wroe | |
| 5,897,041 A | 4/1999 | Ney et al. | |
| D410,820 S | 6/1999 | Lofrano | |
| 5,953,999 A | 9/1999 | Kanehl | |
| 5,954,195 A | 9/1999 | Krueger et al. | |
| 5,971,139 A * | 10/1999 | Bradley | A47G 19/06 206/217 |
| D415,930 S | 11/1999 | Schmidt | |
| 6,021,914 A | 2/2000 | Schmidt | |
| 6,036,020 A | 3/2000 | Distler | |
| 6,109,580 A | 8/2000 | Stern et al. | |
| 6,113,049 A * | 9/2000 | Miljanich | B60N 3/103 248/311.2 |
| 6,152,302 A * | 11/2000 | Miller | B65D 1/36 206/549 |
| D442,830 S | 5/2001 | Raucci | |
| 6,264,026 B1 | 7/2001 | Bradley | |
| 6,302,326 B1 * | 10/2001 | Symonds | G06Q 20/202 235/379 |
| D453,891 S | 2/2002 | Sussman | |
| 6,360,885 B1 | 3/2002 | Krueger et al. | |
| D458,084 S | 6/2002 | Hudson | |
| 6,401,927 B1 | 6/2002 | Sorensen et al. | |
| 6,425,480 B1 | 7/2002 | Krueger et al. | |
| 6,511,030 B1 | 1/2003 | Kelley | |
| 6,533,233 B2 | 3/2003 | Thomas | |
| 6,651,836 B1 | 11/2003 | Hofheins et al. | |
| 6,682,034 B1 | 1/2004 | Vial | |
| 6,732,990 B2 | 5/2004 | Hudson | |
| D506,357 S | 6/2005 | Price | |
| D508,373 S | 8/2005 | Corrieri | |
| D509,104 S | 9/2005 | Price | |
| 6,964,443 B1 | 11/2005 | Newton | |
| 6,971,539 B1 * | 12/2005 | Abbe | B65D 25/205 220/592.12 |
| D524,108 S | 7/2006 | Price | |
| 7,114,630 B2 * | 10/2006 | Dege | B65D 1/36 220/526 |
| D534,816 S | 1/2007 | Newton | |
| D560,973 S | 2/2008 | Parlowski | |
| 7,334,908 B1 | 2/2008 | Figueroa | |
| D563,726 S | 3/2008 | Fraser | |
| D571,228 S | 6/2008 | Maslowski | |
| D575,600 S | 8/2008 | Mayer | |
| D576,455 S | 9/2008 | Siddle | |
| D581,740 S | 12/2008 | Ingle | |
| D592,813 S | 5/2009 | Newsome et al. | |
| D594,280 S | 6/2009 | Wolhendler | |
| D594,281 S | 6/2009 | Luft | |
| D594,705 S | 6/2009 | McComas | |
| D595,093 S | 6/2009 | McComas | |
| D595,094 S | 6/2009 | Vemes et al. | |
| 7,562,785 B2 | 7/2009 | Meissen | |
| D604,993 S | 12/2009 | Vemes et al. | |
| D606,810 S | 12/2009 | Clark | |
| D614,926 S | 5/2010 | Cox | |
| D620,761 S | 8/2010 | Boudreau | |
| D623,019 S | 9/2010 | Wildman | |
| D623,020 S | 9/2010 | Gordon | |
| D623,478 S | 9/2010 | Hayashi | |
| D625,958 S | 10/2010 | Deming | |
| 7,871,050 B2 | 1/2011 | Epstein | |
| 8,015,943 B1 * | 9/2011 | Samuelson | A01K 7/00 119/51.5 |
| D650,237 S | 12/2011 | McComas | |
| D651,028 S | 12/2011 | Grimaldi | |
| D652,323 S | 1/2012 | Clark | |
| D655,136 S | 3/2012 | Goodman | |
| 8,136,667 B2 | 3/2012 | Raynor | |
| 8,146,737 B2 | 4/2012 | D'Agostino | |
| 8,186,524 B2 | 5/2012 | Siahpush | |
| 8,256,639 B1 | 9/2012 | Samuelson et al. | |
| 8,272,512 B2 | 9/2012 | Joseph | |
| D686,459 S | 7/2013 | Maggio | |
| D686,460 S | 7/2013 | Maggio | |
| 8,474,641 B2 * | 7/2013 | Hays | A47G 19/2288 220/23.89 |
| D705,438 S | 5/2014 | Wainwright et al. | |
| D708,062 S | 7/2014 | Navarro | |
| D712,204 S | 9/2014 | Hatcher et al. | |
| D730,124 S | 5/2015 | Tollen et al. | |
| 9,027,825 B2 * | 5/2015 | Baker | B65D 25/00 206/524.1 |
| D732,344 S | 6/2015 | Clark | |
| 9,108,766 B2 * | 8/2015 | Gosen | B65D 21/0223 |
| D737,633 S | 9/2015 | Breton | |
| 9,145,233 B2 * | 9/2015 | Cerrato | B65D 25/04 |
| D750,441 S | 3/2016 | Hartmann | |
| D766,665 S | 9/2016 | Shames | |
| D778,116 S | 2/2017 | Cao | |
| D795,016 S | 8/2017 | Crawford | |
| D805,855 S | 12/2017 | Adams et al. | |
| D808,222 S | 1/2018 | Shames | |
| D819,408 S | 6/2018 | Floco | |
| 2002/0056743 A1 * | 5/2002 | Barcat | A47G 19/04 229/120.01 |
| 2003/0108714 A1 * | 6/2003 | Razeti | B32B 7/12 428/138 |

(56) References Cited

U.S. PATENT DOCUMENTS

| | | | |
|---|---|---|---|
| 2003/0141424 A1 | 7/2003 | Thomas | |
| 2004/0238537 A1* | 12/2004 | Ojeda | B60N 3/002 |
| | | | 220/23.8 |
| 2005/0017134 A1 | 1/2005 | Hooper | |
| 2006/0049073 A1* | 3/2006 | Shannon | B65D 77/2016 |
| | | | 206/459.5 |
| 2007/0023433 A1* | 2/2007 | Vahavihu | B65D 77/208 |
| | | | 220/254.7 |
| 2007/0065545 A1* | 3/2007 | Vovan | B65D 77/046 |
| | | | 426/129 |
| 2008/0264822 A1 | 10/2008 | Faiola | |
| 2009/0120832 A1 | 5/2009 | Munden | |
| 2012/0031806 A1 | 2/2012 | Riley | |
| 2012/0097574 A1 | 4/2012 | Parsons | |
| 2014/0103033 A1* | 4/2014 | Beckman | B65D 25/04 |
| | | | 220/4.01 |
| 2016/0075492 A1* | 3/2016 | Brannock | B65D 43/0212 |
| | | | 220/712 |
| 2016/0236837 A1* | 8/2016 | Malcolm | B65B 51/10 |
| 2017/0245610 A1* | 8/2017 | French | A45C 11/20 |
| 2017/0311752 A1* | 11/2017 | Roever | A47J 36/2483 |

OTHER PUBLICATIONS

"Travel Tray—Convenient Snack and Drink Travel Tray for Car Seats" Website [online], Travel Tray, Oct. 30, 2017 (retrieved on Feb. 6, 201). Retrieved from the Internet: <URL: https.www.traveltray.us/>.

PCT/US2017/067752 International Search Report and Written Opinion, dated Mar. 8, 2018, 7 pages.

\* cited by examiner

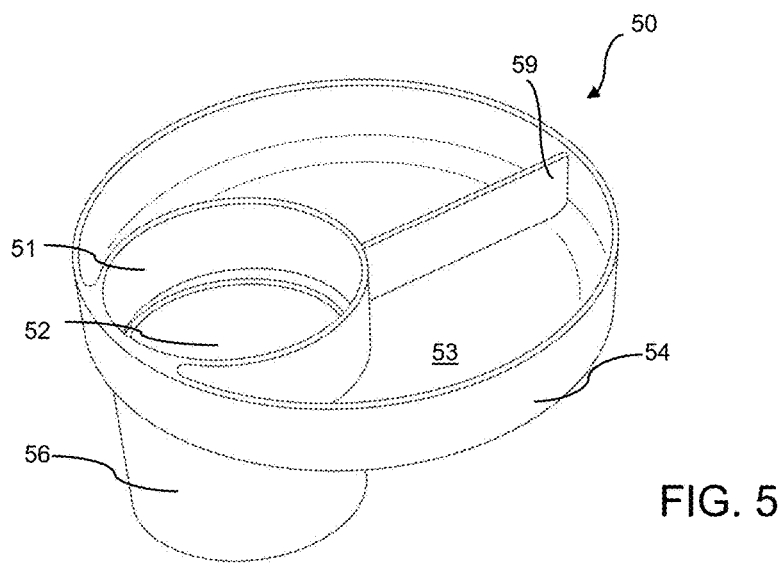
FIG. 5
FIG. 6
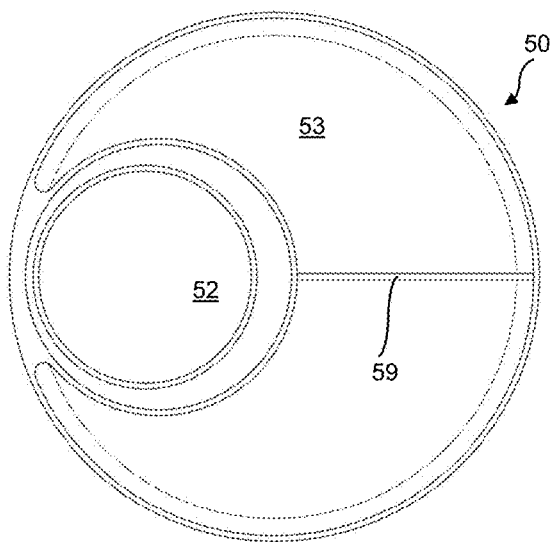
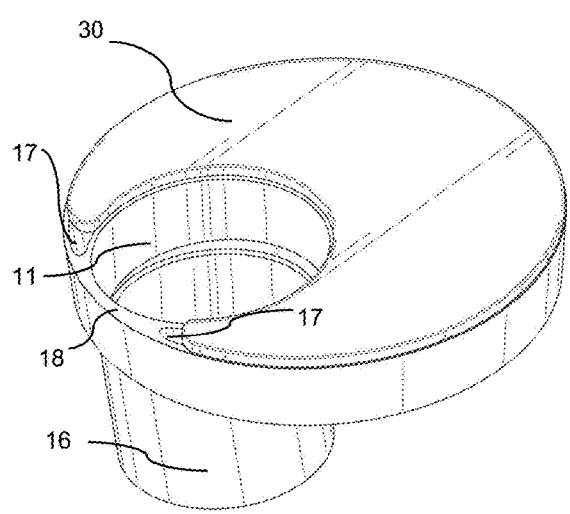
FIG. 7

TRAVEL TRAY AND CONTAINER SYSTEM

FIELD OF THE INVENTION

The present invention relates generally to inserts for cup-holders and particularly to a system for expanding the utility of a vehicle cup-holder to allow food and drinks to be made available to a vehicle occupant.

BACKGROUND

Cup-holders have come to be considered an essential feature in nearly every new vehicle since the 1990s. Multiple cup-holders are now incorporated into virtually every passenger vehicle, providing beverage storage for both front and back seat passengers. Older children and adults can generally reach the vehicle's built in cup-holders easily while secured using the standard seat belt arrangement, however, a smaller child securely strapped into a child seat is significantly limited in his or her range of reach. With most U.S. states requiring infants, toddlers, and children under 60-65 pounds to be strapped into a safety or booster seat secured on the rear seat of the vehicle, it can be a challenge for parents and/or caretakers to attend to the child's needs while driving or sitting in the front passenger seat. Reaching back to hand the child a drink or snack is awkward, sometimes leading to a strained neck or shoulder, and can distract the driver, potentially causing accidents. A relatively recent innovation to child safety seats has been the inclusion of cup-holders in the safety seats. Cup-holders are either built into (integral with) the arm of child seat, or aftermarket holders are available for attachment to the arm or side of the seat, thus providing the child with ready access to a bottle, sippy cup, or other beverage container.

While access to a beverage container is helpful for a child who is being picked up after activity, or during a road trip, a beverage alone does not always solve a parent's need to keep the child comfortable, calm and contented during a lengthy car ride. One of the frequent causes of a child's "meltdown" is hunger and low blood sugar. This, again, presents a challenge to the parent of handing the child appropriate snacks while driving or seated in the front passenger seat. A common approach to this problem is to give the child a container of small finger snacks, such as CHEERIOS®, raisins, or apple slices before beginning the drive. However, since the child must hold onto the container, it can be dropped and spilled if the child becomes distracted or wants to pick up something else. Busy parents often end up deferring the clean-up of such messes, leading to a disgusting build-up of layers of food residue in the vehicle.

A number of solutions have been proposed to facilitate access to food items through the use of a tray/cup-holder combination that extends the capacity and utility of a built-in cup-holder of a vehicle. U.S. Pat. No. 6,533,233 of Thomas discloses a combination tray that transforms an ordinary cup-holder into a multi-cavity tray for conveniently receiving a cup and multiple food items of different sizes. This design is particularly geared toward retaining the types of food purchased from a fast-food drive-through. A similar assembly is described by Hudson in U.S. Pat. No. 6,743,990, in which a pair of flat trays for retaining food or personal items extend radially away from a central cylinder that can be inserted into the existing cup-holder. Numerous similar approaches have been disclosed in the prior art. An important convenience of such devices is that they are intended to remain in the vehicle, retained within the supporting cup-holder. This desire for convenience follows whether the cup-holder is built into the vehicle itself, or it is the cup-holder in a child safety or booster seat, since the safety seat is often left in the vehicle. Most users do not want to have to remember to remove the cup-holder tray each time it has been used with food in order to ensure that it is clean and ready for use for their next trip. As a result, the tray gradually becomes coated with food residue (crumbs, grease, stickiness, etc.) making it unsanitary and unappetizing. Accordingly, the need remains for a system and method for providing convenient clean and safe access to both beverage and food while in a vehicle. The present invention is directed to such a system and method.

SUMMARY OF THE INVENTION

In an exemplary embodiment, a travel tray and container system is provided to allow a vehicle occupant to access a beverage and food items by placing a combination cup-holder and tray base into an existing cup-holder receptacle in a vehicle seat or child safety seat. The tray portion of the base is configured to securely and removably retain a closely-fitted storage container insert into which food items may be placed. In some embodiments, the storage container insert includes a cover or lid to seal the container until ready for use. The base may be left in place in the vehicle while the insert is removed for cleaning or disposal, depending on the material of which it is constructed.

The base includes a cup portion with a lower cylindrical portion that extends downward from the tray portion with a diameter selected to fit snuggly into most cup-holder receptacles. The bottom of the lower cylindrical portion is preferably closed to prevent spilled liquid from leaking out of the base. A separate adapter cylinder may be included in the system for use with slightly larger cup-holder receptacles. The inner diameter of the adapter cylinder fits closely over the outer dimension of the lower cylindrical portion to produce an interference fit.

The cup portion includes an upper cylindrical portion that extends upward from the bottom of the tray portion to define a lip that effectively increases the depth of the cavity that receives the beverage container. The tray portion extends perpendicularly from the upper cylindrical portion with a tray lip at its perimeter, defining an off-center relationship with the cylindrical portion sharing a common wall with one edge of the tray. The tray portion may include one or more dividers to allow different food items to be separated. For compatibility with multiple different container insert sources, the shape of the tray portion will generally be circular or square (preferably with rounded corners), however, other shapes (rectangular or polygonal) may also be used.

The container insert is dimensioned to fit closely within the tray portion. It may be desirable to make this fit sufficiently tight so that a child will not be able to easily remove the insert from the base. The container insert has a perimeter dimension that is slightly smaller than the inner dimensions of the tray lip and a circular cut-out that partially encircles the upper cylindrical portion to allow access to the beverage holder when the container insert is placed in the tray. The circular cut-out and corners defined by the intersection of the upper cylindrical portion and the tray lip ensures a secure fit within the base portion. The wall height of the container insert will generally be close to that of the height of the tray lip, but may be taller to allow a snap-on lid to be placed over the rim of the lip. If the tray portion of the base has built-in dividers, a groove may be formed in the bottom of the container insert to fit over the divider(s), which will also define a divider in the container insert. Alternatively, the container insert may separately have one or more built-in dividers to separate different food items.

The base portion and adapter cylinder will generally be molded of a durable, food-grade plastic, such as acrylonitrile-butadiene-styrene (ABS), polycarbonate, polypropylene, and other recognized food-compliant materials. Particularly preferred materials would be BPA-free, PHT-free and PVC-free. Provided that the selected material is suitable for molding to closely fit within the base tray, the container insert may be formed from similar material to that used for the base, i.e., a re-usable, washable plastic material, or it may be a lightweight, inexpensive plastic material such as food-grade thermoplastics (e.g., polyethylene terephthalate (PET), or polystyrene (PS)) that are generally regarded as disposable or for limited re-use. Other options for insert materials may include biodegradable plastics made from corn starch or other compostable resins, or from molded plant fibers. For re-usable container inserts, the lid may include a perimeter channel configured to snap over the upper edge of the insert. For disposable inserts, foil or clear plastic sheeting may be adhered to the upper edge of the insert.

The travel tray and container system of the present invention is designed to allow the user to leave the base portion in the vehicle while carrying along one or more pre-filled container inserts with food items that may be quickly and conveniently secured in the base portion, then removed once finished. The development of a standard base portion will enable food manufacturers, particularly those who sell foods intended for children's snacks to package their foods in a base-compatible container that allows parents to easily purchase pre-packaged snacks, ready for use. Similarly, fast-food establishments can sell a child's meal in a base-compatible container, allowing the parent to easily and neatly serve the meal to the child while traveling.

In one aspect of the invention, a travel tray and container system includes a base comprising a cylinder configured to removably receive a beverage container and a tray having a tray shape extending in a horizontal plane to bisect the cylinder to define an upper cylinder and a lower cylinder eccentrically disposed within the horizontal plane, the lower cylinder having dimensions configured to closely fit within a cup-holder, the tray having a vertical wall extending around a perimeter thereof, wherein the upper cylinder and an inner surface of the vertical wall define a tray retention volume having an eccentric cut-out region corresponding to the cylinder; an insert having an insert shape and dimensions configured to fit closely and removably within the tray retention volume, the insert having upper edges configured for attachment of a container-sealing lid; and a lid configured for removable attachment to the upper edges of the container insert. In one embodiment, the lid comprises a perimeter lip configured to releasably and resealably attach to the upper edges of the container insert. The inventive system may further comprise an adapter having inner dimensions configured to closely fit over the lower cylinder, and outer dimensions configured to produce a secure fit within the cup-holder. At least one vertical divider may be provided to divide the tray retention volume into a plurality of tray sections.

In an alternative embodiment, the lid may comprise a flexible, tearable film affixed to the upper edges of the container insert. In some embodiments, the tray shape and the insert shape may be circular, while in other embodiments, the shapes are square.

The base is formed from a durable, food-grade plastic. The insert may be formed from a material selected from a food-grade thermoplastic, a biodegradable plastic, a molded pulp, or a molded foil.

In another aspect of the invention, a method for providing access to items to a passenger in a vehicle includes inserting into a cup-holder a base comprising a cylinder configured to removably receive a beverage container and a tray having a tray shape extending in a horizontal plane to bisect the cylinder to define an upper cylinder and a lower cylinder eccentrically disposed within the horizontal plane, the lower cylinder having dimensions configured to closely fit within the cup-holder, the tray having a vertical wall extending around a perimeter thereof, wherein the upper cylinder and an inner surface of the vertical wall define a tray retention volume having an eccentric cut-out region corresponding to the cylinder; removably disposing an insert having an insert shape and dimensions configured to fit closely and removably within the tray retention volume, wherein the insert has upper edges configured for attachment of a container-sealing lid; and removing a lid from the upper edges of the container insert. In some embodiments, the step of inserting the base further includes sliding an adapter cylinder over the cylinder, wherein the adapter cylinder is configured to produce a secure fit within the cup-holder.

BRIEF DESCRIPTION OF THE DRAWINGS

FIG. 5 is a top perspective view of an embodiment of the base portion having a divider.

FIG. 6 is a top view of the embodiment of FIG. 5.

FIG. 7 is a top perspective view of an embodiment of the travel tray and container system with a cover lid.

DETAILED DESCRIPTION OF EXEMPLARY EMBODIMENTS

The present invention is a container system for extending the utility of a cup-holder in a vehicle, child safety seat, or other seat that includes a receptacle for receiving and retaining a beverage container. As used herein, the term "cup-holder" or "built-in cup-holder" means any such receptacle designed to retain a beverage container for use by a person sitting in or near the seat, whether it is integrated into the seat or a nearby surface, e.g., door, console or dashboard, by the original manufacturer, or whether is it had been added as an after-market addition. Built-in cup-holders tend to have standardized dimensions, ranging in diameter from around 7 cm to 8 cm (~2.6 in. to 3.15 in.), with a depth of around 6 to 8 cm (~2.5 to 3 in.). They may be formed as a cylindrical or frustoconical cavity with continuous or semi-continuous sidewalls, or they may be a combination of a horizontal ring mounted above a flat surface, defining a frame to support a beverage container.

Figure 1:
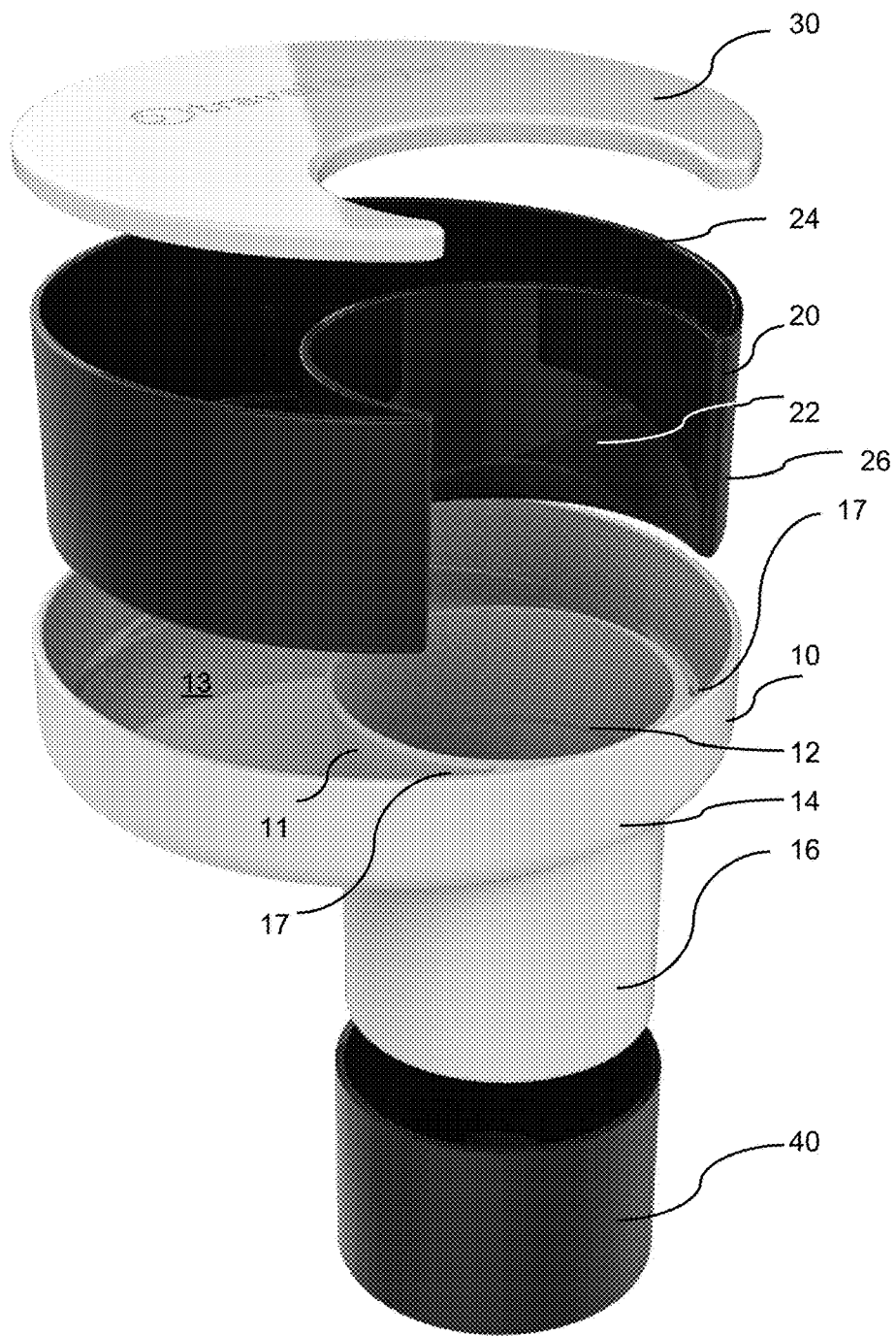
FIG. 1 is an exploded perspective view of an embodiment of the travel tray and container system.
Figure 2:
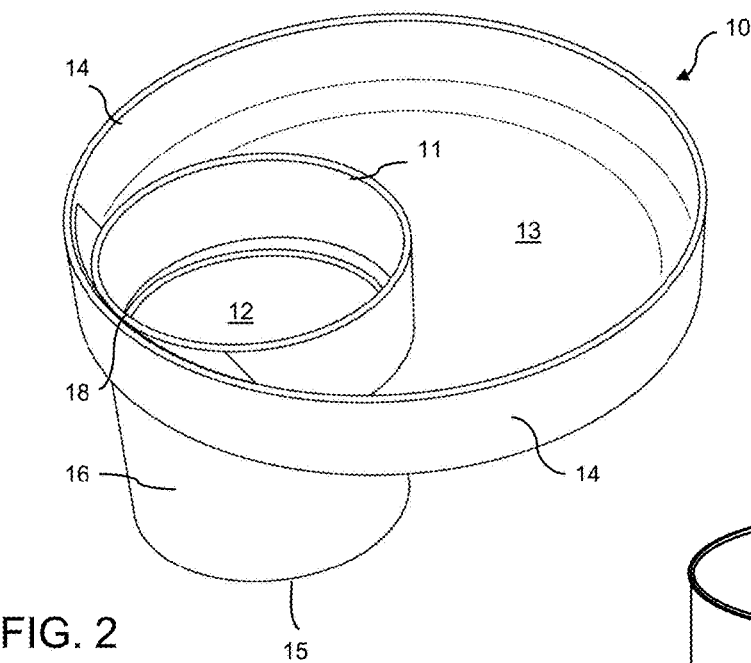
FIG. 2 is a top perspective view of a base portion of the travel tray according to one embodiment of the invention.
Figure 8:
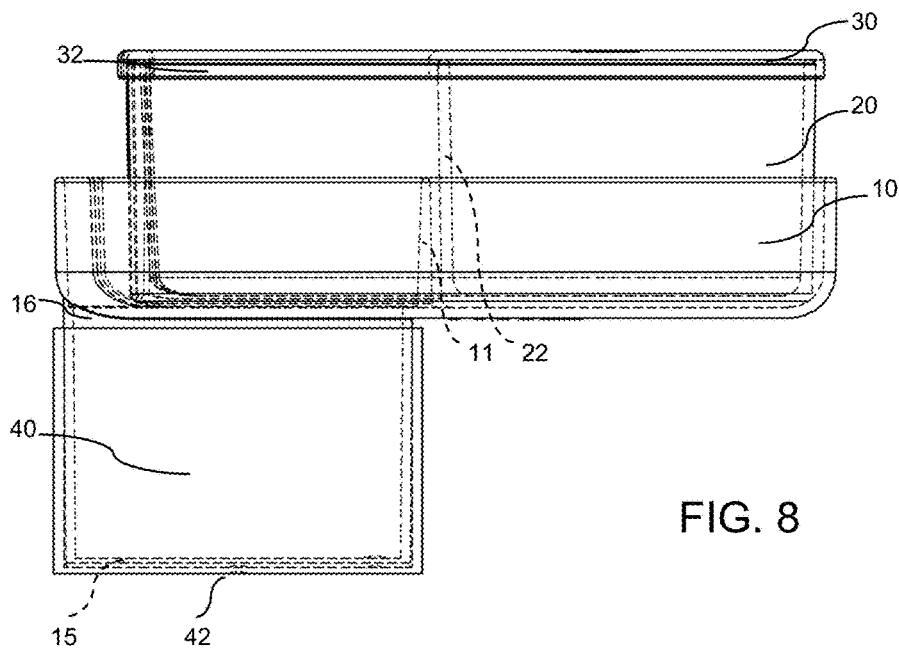
FIG. 8 is a side view of the travel tray and container system with a cover lid and adapter cylinder.

The primary components of the travel tray and container system according to an embodiment of the invention are shown in FIGS. 1 and 8, which include a base 10, container insert 20, lid 30, and adapter cylinder 40.

Figure 4:
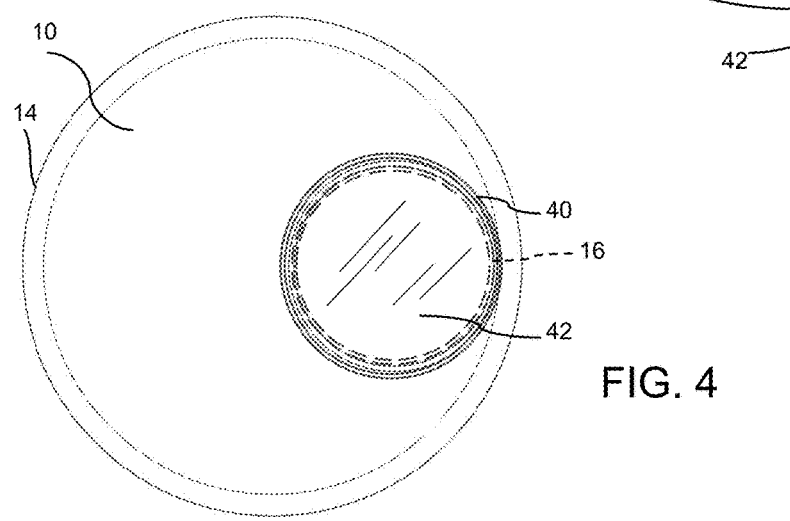
FIG. 4 is a bottom view of a round tray base portion an adapter cylinder.

Base 10, shown in FIGS. 1, 2, 4 and 8 includes a tray portion 13 comprising a planar surface for retaining food or other items within an area defined by vertical sidewall 14 on the outer perimeter of the tray portion 13 and vertical sidewall of the upper cylindrical portion 11 that extends upward from the tray surface. The lower cylindrical portion 16 extends downward from the tray portion 13 to provide an insert for placement into the cup-holder. In an exemplary embodiment, dimensions for lower cylindrical portion 16 are 5-10 cm (~2-4 in. deep), i.e., deep enough to ensure stability within the cup-holder, and 7 to 7.5 cm (~2.75-3 in) in diameter, i.e., to fit snugly within the inner diameter of the cup-holder. The cylinder—upper cylindrical portion 11 and lower cylindrical portion 16—serves as the beverage container receptacle 12 and positioned off-center within the tray, so that a top or bottom view of the base 10 (with a round tray) appears as eccentric circles, as shown in FIG. 4. In this construction, a small arc of upper cylindrical portion 11 is coincident with a small arc of vertical sidewall 14 to define a common wall section 18, with tray corners 17 formed on opposite sides of the common wall section.

The outer lower tray edge defined by the intersection between vertical sidewall 14 and tray portion 13 is preferably rounded or beveled at least one the outside of the tray to provide a smooth edge. The inner seam may also be rounded.

Figure 3:
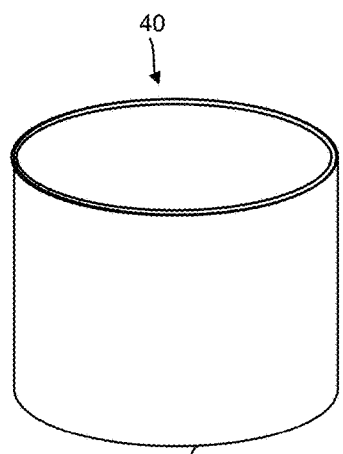
FIG. 3 is a perspective view of a base adapter cylinder.

Adapter cylinder 40, shown in FIG. 3, is a cup-like structure that has an inner diameter to closely fit over the outer diameter of lower cylindrical portion 16 with a wall thickness sufficient to add overall width to the lower portion to fit snugly within the cup-holder. Referring to FIGS. 4 and 8, the close fit between the respective dimensions of the lower cylindrical portion 16 and the adapter cylinder can be seen. The cylinder 40 may have a closed bottom 42, or may simply be a ring. In either configuration, the cylinder should fit tightly enough over lower cylindrical portion 16 to resist accidental removal of the tray from the cup-holder, yet still allow the pieces to be separated by twisting and sliding the cylinder 40 off of the lower cylindrical portion using sufficient hand force. Beyond adding overall width, adapter cylinder 40 may optionally be taller than lower cylindrical portion 16 to add further depth for deeper cup-holders. For example, if the depth of lower cylindrical portion 16 is about 5 cm (2 in.), adapter cylinder 40 may be 8-9 cm (~3.2 to 3.5 in.) tall to ensure a secure and stable fit in deeper cup-holders.

Referring to FIGS. 5 and 6, an alternative embodiment of the round base 50 has the same essential features as the embodiment of FIGS. 1, 2, 4 and 8, but adds a vertical divider 59 that splits the tray area into two compartments 53 that may be used to separately retain different food items, for example, crackers and fruit pieces. As will be readily apparent to those in the art, multiple dividers may be provided in the base to define additional compartments. The compartments may have the same dimensions, or may have different dimensions. For example, a smaller compartment could be provided for placement of a small dipping item, such as peanut butter or a cocoa spread, while larger compartments are provided for holding crackers or fruit. As in the previous embodiment, base 50 includes an upper cylinder 51, a lower cylinder 56, vertical outer wall 54 and beverage receptacle 52.

Figure 9A:
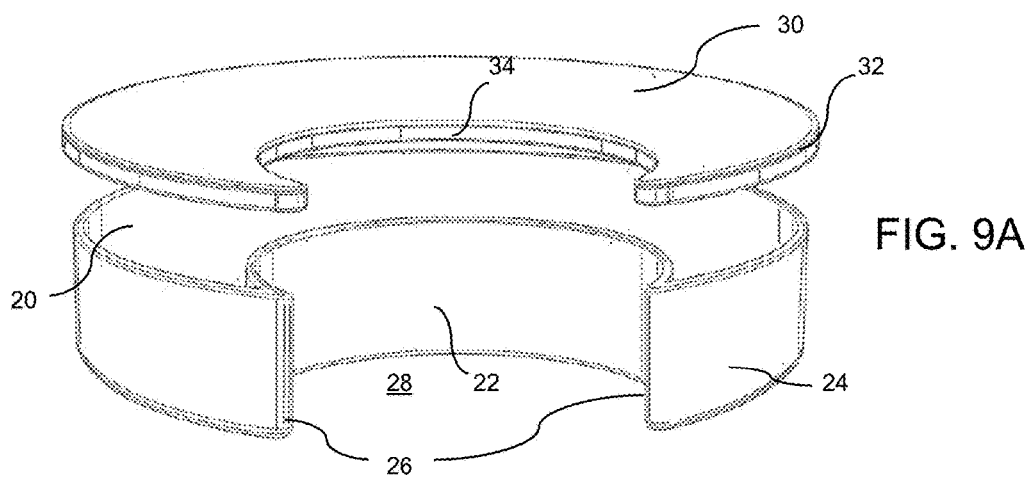
FIG. 9A is an exploded perspective view of a container insert and lid.

FIG. 9A provides an exploded view of a container insert 20 and lid 30. Container insert 20 has vertical sidewalls 24 with an outer dimension configured to fit closely within the inner dimension of tray vertical wall 14. Container cut-out 28 corresponds to the beverage receptacle 12 in the tray, with container vertical wall 22 partially encircling the outer wall of upper cylindrical portion 11. Container corners 26 fit into tray corners 17. The close fit between the sidewalls of the container insert 20 and the base 10 retain the container securely within the base tray. The vertical walls of container insert 20 may be the same height as those of the base, e.g., ~2 cm (~0.6 in) or may be taller to allow lid 30 to easily snap over the top edges of the insert 20. The system may include multiple inserts having a range of different insert heights to accommodate different food items or volumes. For example, a taller container would be desirable for retaining a muffin or frosted cupcake to avoid crushing the muffin or smearing frosting all over the lid. Lid cut-out 34 matches the container cut-out 28 and the upper cylinder 11 to provide unrestricted access to the beverage container retained within beverage receptacle 12.

Figure 10:
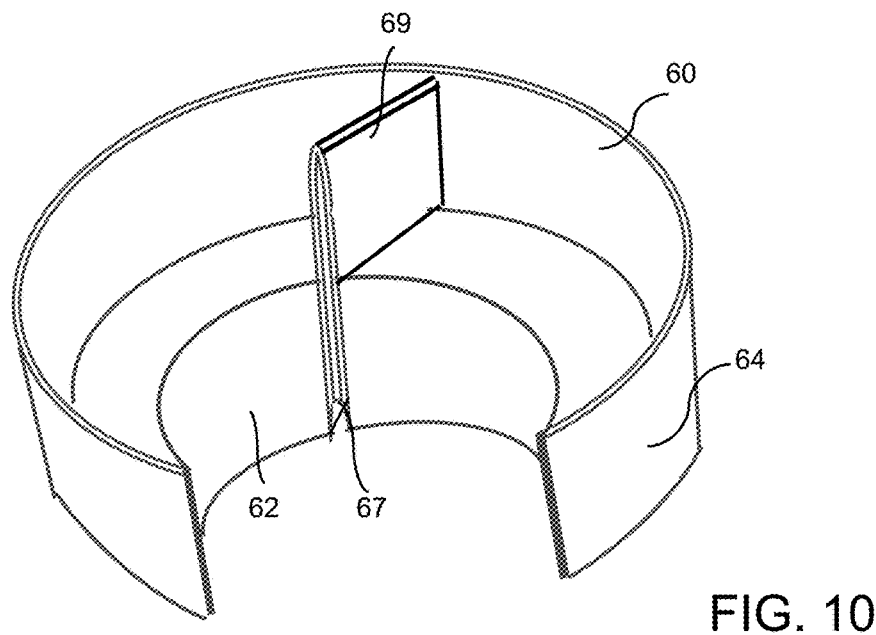
FIG. 10 is a perspective view of a container insert with a divider.

Referring to FIG. 10, for a base with built-in dividers, for example, as shown in FIGS. 5 and 6, a groove 67 may be formed in the bottom of the container insert 60 to fit over the divider(s). The formation of the groove 67 during the molding process can also be used to define a divider 69 in the container insert. Alternatively, the container insert may separately have one or more built-in dividers to separate different food items.

Figure 13:
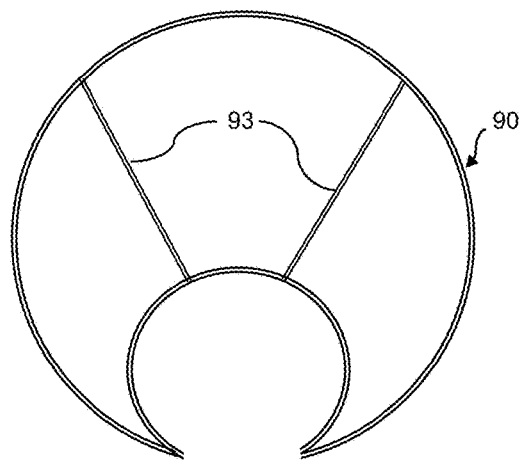
FIG. 13 is a top view of a first embodiment of a round container insert with two dividers.
Figure 14:
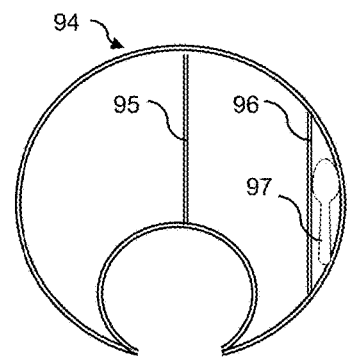
FIG. 14 is a top view of a second embodiment of a round container insert with two dividers.

The container inserts 90 and 94, shown in FIGS. 13 and 14, provide two possible examples of divider arrangements for inserts that would fit within the inventive travel tray and container system having the round base configuration shown in FIGS. 1, 2, 4 and 8. In the first example, insert 90 has two dividers 93 of substantially equal length to define three tray areas of roughly equal volume. In the second example, insert 94 has two dividers 95 and 96 of different lengths, to define two large volume tray areas and one smaller area that may be useful for retaining an eating utensil 97, or a toy or other small distraction for a child. Other variations will be readily apparent to those in the art. The key to the utility of the container insert is the ability to provide many different serving options for use with a standard base 10.

Figure 11:
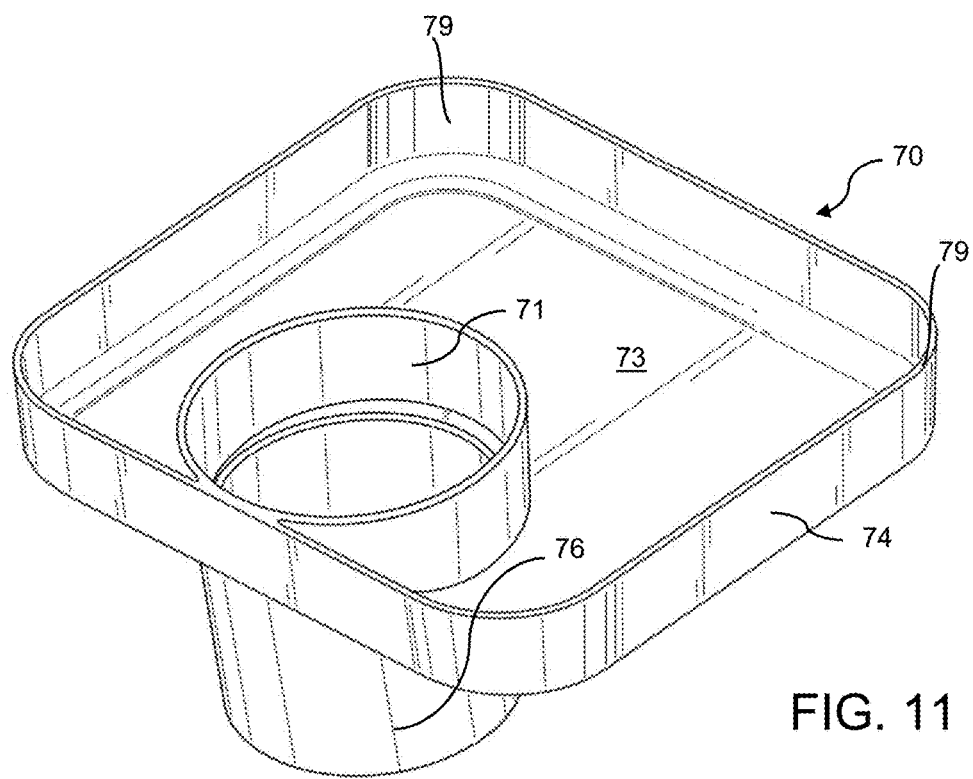
FIG. 11 is a top perspective view of a base portion with a square tray.
Figure 12:
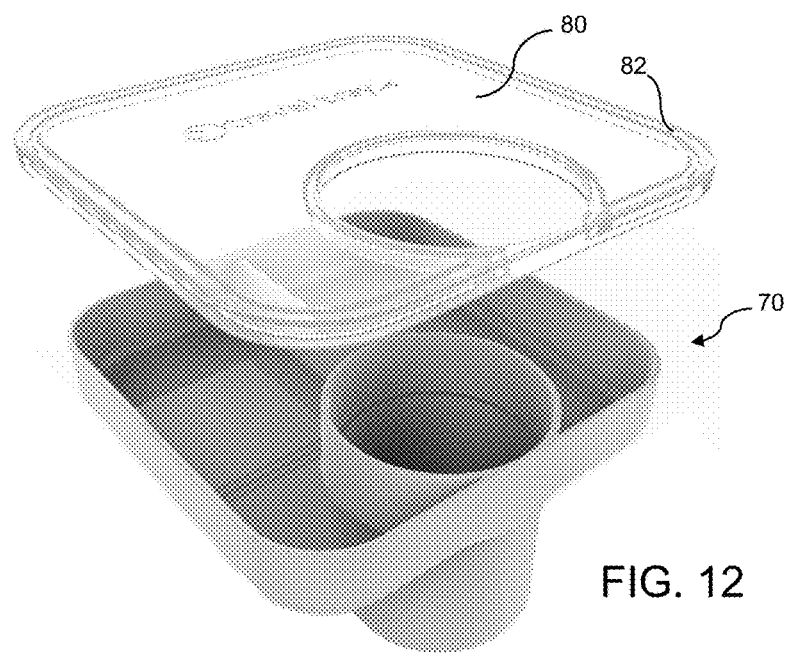
FIG. 12 is an exploded perspective view of a base portion with a lid.

Alternative shapes may be used for the travel tray and container system. FIGS. 11 and 12 illustrate a square-shaped base 70 with the same basic features as that of the round embodiments. The upper and lower cylindrical portions 71 and 76 are dimensioned similar to that of the round embodiments, with the cylinder again positioned eccentrically within the square tray area 73. The corners 79 of the square are preferably rounded. The square base 70 would use the same adapter cylinder 40, but the container insert and lid would be shaped to match the square outline. Similarly, other polygons, such as triangles, pentagons, hexagons, etc., could be used as long as corresponding inserts and lids are available.

The base and adapter cylinder will generally be molded of a durable, food-grade plastic, such as acrylonitrile-butadiene-styrene (ABS), polycarbonate, polypropylene, and other recognized food-compliant materials. Particularly preferred materials would be BPA-free, PHT-free and PVC-free. Provided that the selected material is suitable for molding to closely fit within the base tray, the container insert may be formed from similar material to that used for the base, i.e., a re-usable, washable plastic material, or it may be a lightweight, inexpensive plastic material such as food-grade thermoplastics (e.g., polyethylene terephthalate (PET), or polystyrene (PS)) that are generally regarded as disposable or for limited re-use. Other options for insert materials may include biodegradable plastics made from corn starch or other compostable resins, molded plant fibers, e.g., compressed pulp containers, or molded foil containers. For re-usable container inserts, the lid 30 may include a resilient perimeter lip configured to snap over the upper edge of the insert. (See, for example, lip 82 of lid 80 shown in FIG. 12.) For disposable inserts, foil or clear plastic sheeting may be adhered to the upper edge of the insert by an appropriate adhesive or by heat-sealing.

The travel tray and container system of the present invention provides a clean and convenient method to providing food items for any vehicle passenger with access to a cup-holder, most especially for small children confined to a child safety seat. To prepare for a road trip of any length, the parent may pre-pack and seal one or more container inserts with healthy and/or fun snacks, storing them in a refrigerator if necessary, then grab them and stash them in a tote bag or backpack on the way out the door. For food requiring continued refrigeration, the parent may bring along a small cooler bag or ice chest for use on longer trips. For example, the parent can place the first pre-packed insert into the base along with the child's beverage container as he or she is strapping the child into the seat. Once the lid has been removed, the child is able to eat, and have access to a beverage, as the parent drives, without constantly asking for his or her snack or drink. If the child finishes the snack or tires of the current options, the parent can remove the insert from the base, replace the lid and place it back in a tote bag, backpack or other carrier, then offer another selection from the additional pre-packed containers. By using a removable/replaceable container insert to hold the food items, the base remains clean and can be left in the vehicle after exiting without concern about it becoming caked with food residue. On the other hand, the compact inserts, are easily carried to and from the vehicle.

Figure 9B:
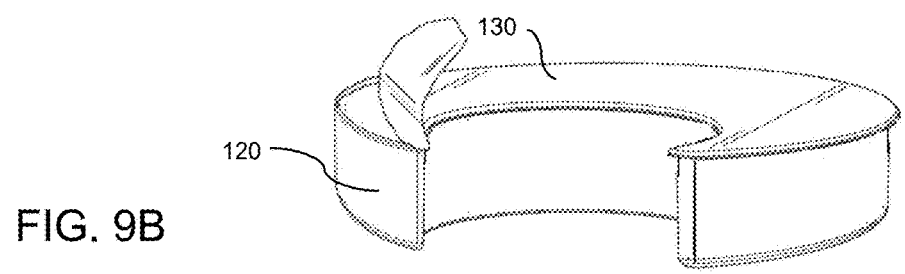
FIG. 9B is a perspective view of a container insert with a flexible film cover partially peeled away.

Providing a travel tray and container system with a standardized shape and dimension enables a myriad of possibilities for feeding and/or entertaining a passenger, particularly a child, during driving excursions of any length. Pre-packaged meal meat and cheese combinations, for example, the Lunchables® (Oscar Meyer® or Dairylea®) snack products, can be provided in a system-compatible container insert, allowing the parent to simply purchase commercially-packed combinations at a market. Similarly, fast food restaurants can offer a standard "kid's meal" in a system-compatible insert. A removable/replaceable lid, e.g., lid 30 as shown in FIG. 9A, can be provided with such meals, or the insert can simply be sealed with a flexible tear-off film cover 130 of food-grade plastic or paper sheeting, or aluminum foil, as shown in FIG. 9B. The film seal 130 can be attached to the upper edges of container insert 120 using known methods including an appropriate adhesive or heat sealing.

Based on the descriptions provided herein, it will be readily apparent to those in the art that other variations and combinations of the described elements may be created without departing from the fundamentals of the invention disclosed herein. Accordingly, the scope of the invention is to be limited only by the appended claims.

The invention claimed is:

1. A cup-holder tray and container system, comprising:
    a base comprising a cylinder configured to removably receive a beverage container and a tray integrally formed with the cylinder, the tray having a tray shape extending in a horizontal plane to bisect the cylinder to define an upper cylinder and a lower cylinder eccentrically disposed within the horizontal plane, the lower cylinder extending downward from the horizontal plane and having dimensions configured to be fully and releasably inserted within a cup-holder receptacle of a seat so that a bottom surface of the tray is configured to contact a surface of the seat surrounding the cup-holder receptacle, the tray having a vertical wall extending around a perimeter of and upward from the horizontal plane, wherein the upper cylinder and an inner surface of the vertical wall define a tray retention volume having an eccentric cut-out region corresponding to the cylinder;
    an insert having a bottom, an eccentric cut-out region, and sidewalls defining an insert shape and dimensions configured to fit closely and be removably seated on the horizontal plane within the tray retention volume, the bottom and sidewalls defining a container volume for retaining a material; and
    an insert lid configured for removable attachment to upper edges of the sidewalls of the insert to seal the container volume.

2. The system of claim 1, wherein the insert lid comprises a perimeter lip configured to releasably and resealably attach to the upper edges of the insert.

3. The system of claim 1, further comprising an adapter having inner dimensions configured to closely fit over the lower cylinder, and outer dimensions configured to produce a secure fit within the cup-holder.

4. The system of claim 1, further comprising at least one vertical divider integrally formed within the container volume of the insert, that at least one divider configured to divide the container volume into a plurality of container sections.

5. The system of claim 1, wherein the insert lid comprises a flexible, tearable film affixed to the upper edges of the insert.

6. The system of claim 1, wherein the tray shape and the insert shape are circular.

7. The system of claim 1, wherein the tray shape and insert shape are square.

8. The system of claim 1, wherein the base is formed from a durable, food-grade plastic.

9. The system of claim 1, wherein the insert is formed from a material selected from a food-grade thermoplastic, a biodegradable plastic, a molded pulp, or a molded foil.

10. The system of claim 1, wherein the insert lid includes an eccentric cut-out region corresponding to the eccentric cut-out region of the insert.

11. A method for providing access to items to a person in a seat having a recessed cup-holder receptacle, the method comprising:
    inserting into the cup-holder receptacle a base comprising a cylinder configured to removably receive a beverage container and a tray integrally formed with the cylinder, the tray having a tray shape extending in a horizontal plane to bisect the cylinder to define an upper cylinder and a lower cylinder eccentrically disposed within the horizontal plane, the lower cylinder extending downward from the horizontal plane and having dimensions configured to be fully and releasably retained within the cup-holder receptacle so that a bottom surface of the tray is configured to contact a surface of the seat surrounding the cup-holder receptacle, the tray having a vertical wall extending around a perimeter of and upward from the horizontal plane, wherein the upper cylinder and an inner surface of the vertical wall define a tray retention volume having an eccentric cut-out region corresponding to the cylinder;

removably disposing an insert having a bottom, an eccentric cut-out region, and sidewalls to define an insert shape and dimensions configured to fit closely and be removably seated on the horizontal plane within the tray retention volume, wherein the bottom and sidewalls define a container volume for retaining the items; and removing an insert lid from upper edges of the sidewalls of the insert.

12. The method of claim 11, wherein inserting the base further comprising sliding an adapter cylinder over the lower cylinder, wherein the adapter cylinder is configured to produce a secure fit within the cup-holder.

13. A cup-holder tray and container system, comprising:
a tray integrally formed with a cylinder configured to removably receive a beverage container, the tray extending in a horizontal plane to bisect the cylinder to define an upper cylinder and a lower cylinder eccentrically disposed within the horizontal plane, the lower cylinder extending downward from the horizontal plane and having dimensions configured to be releasably received within a cup-holder receptacle of a seat so that a bottom surface of the tray is configured to contact a surface of the seat surrounding the cup-holder receptacle, the tray having a tray shape defined by a vertical wall extending around a perimeter of and upward from a tray surface defined by the horizontal plane, wherein the upper cylinder and an inner surface of the vertical wall and the tray surface define a tray retention volume having an eccentric cut-out region corresponding to the cylinder; and an insert having an insert shape with an eccentric-cut-out region corresponding to the tray retention volume, an insert lower surface, and insert sidewalls each configured to fit closely and removably within the tray so that the insert lower surface is in contact with the tray surface and the insert sidewalls are in contact with the inner surface of the vertical wall, wherein the insert lower surface and sidewalls define a container volume configured for retention of items.

14. The system of claim 13, wherein the insert sidewall has upper edges, the system further comprising a removable seal attached to the upper edges.

15. The system of claim 14, wherein the removable seal comprises a snap-on lid configured for removable and replaceable attachment to the upper edges.

16. The system of claim 14, wherein the removable seal comprises a flexible, tearable film affixed to the upper edges of the insert.

17. The system of claim 13, further comprising an adapter having inner dimensions configured to closely fit over the lower cylinder, and outer dimensions configured to produce a secure fit within the cup-holder.

18. The system of claim 13, further comprising at least one integrally-formed vertical divider configured to divide the tray retention volume into a plurality of tray sections.

19. The system of claim 13, further comprising at least one integrally-formed vertical divider configured to divide the container volume into a plurality of container sections.

20. The system of claim 13, wherein the tray shape and the insert shape are circular or square.

21. The system of claim 13, wherein the insert is formed from a material selected from a food-grade thermoplastic, a biodegradable plastic, a molded pulp, or a molded foil.

22. The system of claim 14, wherein the removable seal includes an eccentric cut-out region corresponding to the eccentric cut-out region of the insert.

\* \* \* \* \*